United States Patent [19]

Jansen et al.

[11] Patent Number: 5,656,328
[45] Date of Patent: Aug. 12, 1997

[54] ANHYDROUS GELS AND XEROGELS CONTAINING NO HYDROXYL GROUPS, PROCESS FOR THE PRODUCTION THEREOF AND USE THEREOF

[75] Inventors: Martin Jansen, Bonn; Eberhard Günther, Niederkassel, both of Germany

[73] Assignee: Cerdec Aktiengesellschaft Keramische Farben, Frankfurt, Germany

[21] Appl. No.: 518,602

[22] Filed: Aug. 21, 1995

[30] Foreign Application Priority Data

Aug. 19, 1994 [DE] Germany .................. 44 29 533.2

[51] Int. Cl.⁶ .................. B05D 7/00; B01J 13/00
[52] U.S. Cl. .................. 427/215; 106/450; 106/452; 252/315.2; 501/12; 501/102; 501/103; 501/106
[58] Field of Search .................. 252/315.2, 315.5, 252/315.6; 501/12, 102, 103, 106; 106/450, 452; 427/215, 218, 219

[56] References Cited

U.S. PATENT DOCUMENTS

| | | | |
|---|---|---|---|
| 4,317,668 | 3/1982 | Susa et al. | 501/12 X |
| 4,539,399 | 9/1985 | Armstrong | 210/502.1 X |
| 4,816,499 | 3/1989 | Nomura et al. | 252/315.2 X |
| 5,122,291 | 6/1992 | Wolff et al. | 252/315.6 X |
| 5,270,027 | 12/1993 | Balducci et al. | 252/315.6 X |
| 5,384,294 | 1/1995 | Teowee et al. | 501/12 X |
| 5,403,368 | 4/1995 | Takahashi et al. | 501/12 X |
| 5,426,082 | 6/1995 | Marsden | 502/235 |

FOREIGN PATENT DOCUMENTS

| | | |
|---|---|---|
| 0 021 333 | 1/1981 | European Pat. Off. . |
| 2 585 973 | 2/1987 | France . |
| WO93/23333 | 11/1993 | WIPO . |
| WO94/24052 | 10/1994 | WIPO . |

OTHER PUBLICATIONS

Corriu et al., Chemistry of Materials, vol. 4, No. 5 Sep.–Oct. 1992 pp. 961–963.

Database WPI, Derwent Publications Ltd. London Great Britain AN 92–362499 JP–A–04265 225 (Tsuchiya KK) (1992).

*Primary Examiner*—Richard D. Lovering
*Attorney, Agent, or Firm*—Wenderoth, Lind & Ponack

[57] ABSTRACT

Gels based on a network of oxygen-bridged metal and/or semi-metal atoms and produced using a hydrolytic sol-gel process are often not homogeneous. Known non-hydrolytic sol-gel processes give rise to gels containing halogen.

A novel non-hydrolytic sol-gel process has been found which gives rise to halogen-free and homogeneous gels and to xerogels obtainable therefrom.

In this process, one or more compounds (I) from the series of metal or semi-metal alkoxides, oxoalkoxides, amides or oxoamides are condensed, with elimination of carboxylic acid esters or carboxylic acid amides, until gelation occurs with one or more compounds (II) from the series of metal or semi-metal carboxylates or oxocarboxylates in an anhydrous organic solvent containing no hydroxyl groups.

Preferred gels and xerogels contain in the network metal or semi-metal atoms from main group and subgroup III to V and from the rare-earth elements.

The gels and xerogels may be used for the production of oxide ceramic materials and for encapsulating pigments.

18 Claims, 1 Drawing Sheet

ANHYDROUS GELS AND XEROGELS CONTAINING NO HYDROXYL GROUPS, PROCESS FOR THE PRODUCTION THEREOF AND USE THEREOF

This invention relates to anhydrous gels and xerogels containing no hydroxyl groups and based on a network of oxygen-bridged metal and/or semi-metal atoms, the unbridged valencies of which are saturated by oxygen and/or organic residues, but not by halogen atoms. The process according to the invention is based upon a non-hydrolytic sol-gel process, wherein gels and xerogels of the most varied composition may be obtained. This invention also relates to the use of the gels and xerogels for the production of oxide ceramic materials and for encapsulating particulate solids in a layer of oxide ceramic material.

Many gels and xerogels based on networks of oxygen-bridged metal or semi-metal atoms are known from the prior art. There are various applications for such gels and xerogels, such as adsorbents and as a raw material for catalysts and oxide-ceramic substances. Such gels may be converted into very pure oxide materials by thermolysis.

The term "gels" is hereinafter taken to denote disperse systems comprising a networking-forming substance and a liquid dispersant. The term "xerogels" is taken to denote gels which have lost their liquid in any manner, for example by evaporation, pressing and suction filtration, wherein the spatial arrangement of the network may alter by the distances between the structural elements becoming smaller and a state bordering on the solid state being achieved.

Gels based on a network of oxygen-bridged metal atoms or semi-metal atoms are generally produced by a sol-gel process. Examples of the starting substances for so-called hydrolytic sol-gel processes, which comprise both hydrolysis and a condensation reaction, are metal or semi-metal salts, such as nitrates or chlorides, which are pH-dependently hydroxylated in the aqueous phase in a first stage, or metal or semi-metal alkoxides, which are entirely or partially hydroxylated in an organic solvent by adding water; this first stage is followed by the condensation stage with elimination of water. In such hydrolytic sol-gel processes, problems frequently occur during the production of binary oxide gels in controlling stoichiometry, such that homogeneity is not ensured—see *Chemistry of Materials*, volume 4, n° 5 (1992), 961 to 963. Due to the nucleophilic nature of water, the condensation reaction, which is initiated by hydrolysis, is reversible, thus hindering uniform gelation. A further problem of these aqueous sol-gel processes is excessively rapid gelation. In order to control gel growth, the condensing agent, water, must be added slowly and in a controlled manner and its concentration within the solution must be uniform. While this may indeed be achieved within the reaction mixture by "in situ" production of water by secondary reactions which yield water, such as ester formation from alcohols and carboxylic acids or acetal formation from alcohols and aldehydes, problems cannot be avoided during subsequent processing of the gels.

By using the tetraethyl orthosilicate, ethanol and benzaldehyde system, an initially introduced quantity of cadmium sulphoselenide pigment may be enclosed in the silicate as it forms. It has, however, been found in thermolysis tests that the water incorporated into the gel cannot readily be completely removed. Moreover, it has the characteristic of abruptly leaving the gel from a certain temperature. This shatters the gel and exposes the pigment, which is destroyed at the prevailing temperatures. Gels containing water are thus apparently unsuitable for the production of a resistant shell around temperature-sensitive pigments.

In order to overcome the problems of hydrolytic sol-gel processes, the above-stated document discloses non-hydrolytic sol-gel processes. According to these processes, metal alkoxides are reacted with metal halides in the absence of water and alcohol, wherein the oxygen bridge is formed between two metal atoms by a direct condensation reaction and alkyl halide is eliminated:

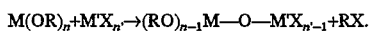

M and M' denote metals and semi-metals from the series Si, Al, Ti and Zr, n and n' denote the valency thereof; OR denotes alkoxide ad X halogen. As condensation proceeds, with ligand exchange also occurring as a secondary reaction, a network is formed with a uniform distribution of the structural units M—O—M', M—O—M and M'—O—M'.

The reactivity of the reactants of the prior art non-hydrolytic sol-gel process is sometimes highly variable. While the use of $MX_n$ instead of $M(OR)_n$ and of $M'(OR)_{n'}$ instead of $M'X_{n'}$ may indeed in some cases result in a desirable increase in reactivity, this exchange is not, however, generally applicable. Furthermore, the presence of halogen in the gels and the xerogels obtainable therefrom is undesirable in certain applications and the production of alkyl halide during the condensation reaction demands particular safety measures on toxicological grounds.

The object of the present invention is thus to provide another non-hydrolytic sol-gel process in order to extend the range of potential production options. A further object relates to the provision of novel anhydrous gels containing no hydroxyl groups, the network of which gels contains no halogen attached to metal atoms.

Finally, it should also be possible to use the gels according to the invention and the process for the production thereof for encapsulating particulate grains in a gel shell in order, after thermal treatment, to obtain encapsulated particles with an impervious shell of oxide-ceramic material, which was not satisfactorily possible using prior art hydrolytic sol-gel processes.

A novel non-hydrolytic sol-gel process has been found which gives rise to novel gels and xerogels, which are suitable starting materials for oxide ceramic materials.

The present invention thus provides anhydrous gels and xerogels containing no hydroxyl groups based on a network of oxygen-bridged metal and/or semi-metal atoms, wherein the network contains one or more species of metal and/or semi-metal atoms and additionally present unbridged valencies of the metal and/or semi-metal atoms are saturated by oxygen atoms and/or by monovalent residues from the series —Q and/or —OT, wherein —Q denotes —OR$^1$ or —NR$^1$R$^2$, —T denotes —C(O)R$^3$ and R$^1$, R$^2$ and R$^3$ denote an aliphatic or aromatic organic residue, and no halogen is attached to metal and/or semi-metal atoms.

The network of the gels and xerogels according to the invention may contain a single species of metal or semi-metal atoms; in this case, the xerogel is a precursor for pure oxides. Essential structural elements of the network of such gels are M—O—M (M=metal or semi-metal), M=O, M—Q and M—OT.

If compounds of two, three or four different metals or semi-metals are used in a stoichiometric quantity in the production according to the invention of the gels, which is described below, binary, ternary or quaternary gels and xerogels may be obtained—stoichiometric is here taken to mean an atomic ratio as is appropriate for the mixed oxides obtainable by thermolysis from the xerogels. The process according to the invention may also be used to obtain gels and xerogels which additionally contain one or more doping metals or semi-metals in a uniform distribution in the network: the quantity of doping elements is determined by the intended application and ranges from fractions of an atomic percent, relative to the metal(s) or semi-metal(s) forming the network, up to a quantity yielding pure mixed oxides after thermolysis of the xerogels.

The semi-metals of the gels and xerogels according to the invention are in particular boron; silicon and germanium; arsenic, antimony and bismuth; selenium and tellurium. The metals are those of main groups and subgroups II to VI and the rare-earth elements. The metals must be capable of forming alkoxides, amides and/or carboxylates and, in the form of such a compound, must be at least partially soluble in an aprotic, slightly polar solvent. Preferred metals and semi-metals are those of main groups and subgroups III to V and the rare-earth elements, in particular B, Al, Si, Ge, Sn; Ti, Zr, Hf, V; Sc, Y, La, Ce, Pr.

The valency of the metals and semi-metals is between 2 and 6, preferably between 3 and 5. The gels may also contain one or two species of divalent metal atoms because secondary valencies as ell as primary valencies are active in three-dimensional network formation and thus allow gelation. As is revealed by IR spectroscopic investigation, secondary valencies are possible by the presence of carboxylate groups. Binary gels preferably contain in the network divalent and more highly valent metals and/or semi-metals, in particular trivalent and trivalent, trivalent an tetravalent, trivalent and pentavalent, tetravalent and tetravalent and tetravalent and pentavalent metals and/or semi-metals. The substantial structural element of binary gels is $M^1$—O—$M^2$; if, during reproduction of the gels using the process according to the invention, there is a ligand exchange of the residues —Q and —OT attached to $M^1$ and $M^2$, structural elements $M^1$—O—$M^1$ and $M^2$—O—$M^2$ may also be expected.

The residue —Q is an organic residue —$OR^1$ attached to an oxygen atom, preferably an alkoxy or aryloxy group, or a dialkylamino group, monoarylalkyl or diarylamino group —$NR^1R^2$. Preferred groups $R^1$ and $R^2$ are alkyl groups, which may be linear or branched and preferably contain 1 to 6, in particular 1 to 3 C atoms, or phenyl or substituted phenyl. The residue —OT is an aliphatic or aromatic acyloxy group —OC(O)—$R^3$, the residue $R^3$ of which is preferably phenyl or substituted phenyl or linear or branched alkyl with 1 to 6, in particular 1 to 3 C atoms. T particularly preferably denotes an acetyl or propionyl residue. Gels and xerogels obtainable using the process according to the invention generally still contain residues —Q and/or —OT attached to the metal or semi-metal atoms. The quantity depends upon the conversion of the condensation reaction and the ratio of the number of equivalents of —Q and equivalents of —OT in the starting mixture.

Gels according to the invention contain an aprotic, weakly nucleophilic or, preferably, non-nucleophilic solvent as dispersant. Due to the highly electrophilic nature of the educts used in the process according to the invention it, is possible or the solvent not to be nucleophilic or to be only slightly so. The solvents are conveniently slightly polar and have a boiling point in the range from 50° C. to 230° C., preferably from 80° C. to 150° C., so that the solvent may straightforwardly be completely eliminated on conversion of the gels into xerogels. Suitable dispersants are in particular aliphatic, cycloaliphatic and aromatic hydrocarbons, such as in particular isoparaffins with a boiling point in the range from 80° to 230° C. and alkyl aromatics, such as toluene. The gels may in principle also contain slightly polar halogenated hydrocarbons as the dispersant; such solvents are, however, less preferred.

Apart from chemical analysis, spectroscopic methods, such as FTIR spectra, and differential thermal analysis, process parameters are also suitable for characterising the gels and xerogels.

Figure 1:
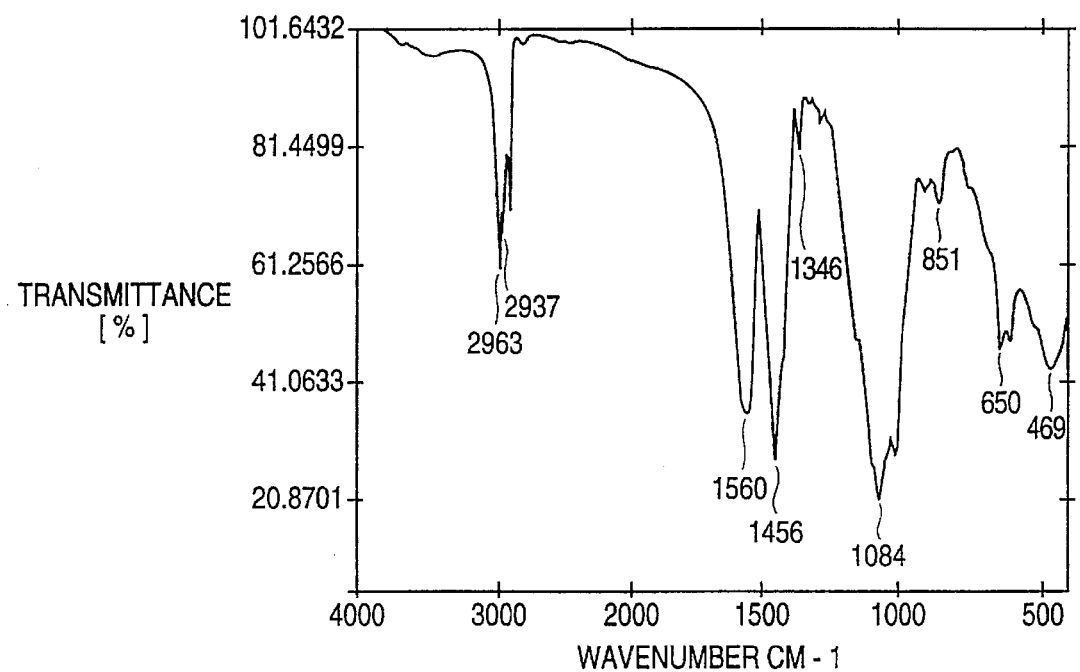
FIGS. 1 and 2 show the FTIR spectrum of the xerogels of example 1 and example 2.
Figure 2:
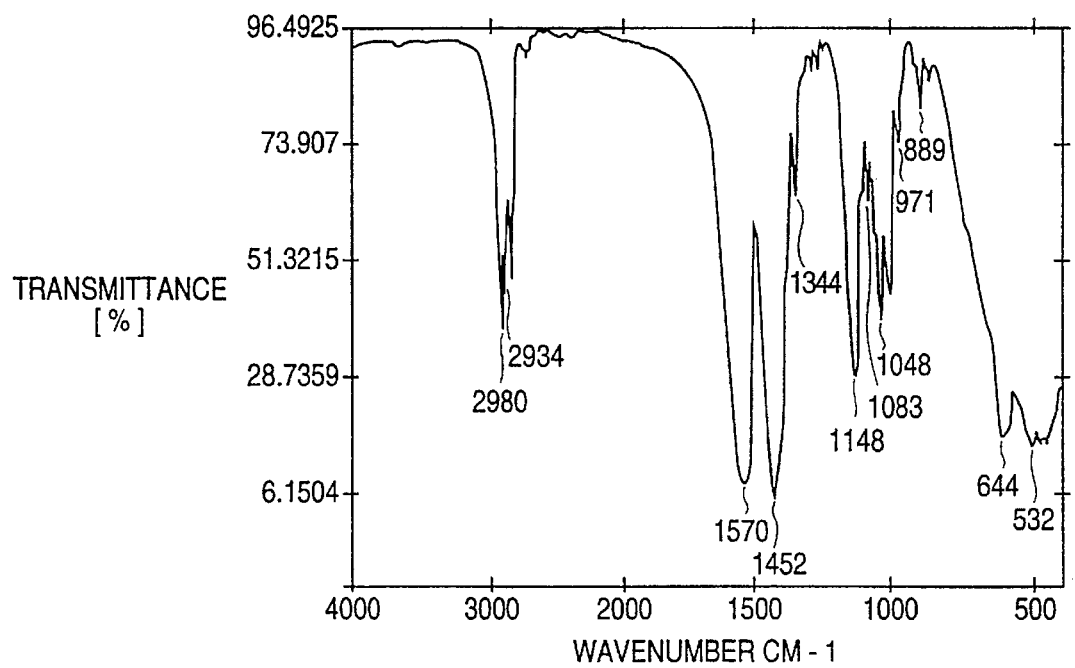

Reference is made to FIGS. 1 and 2, which show the FTIR spectrum of the xrogels of example 1 (gel as precursor for $ZrSiO_4$) and of example 2 (precursor for $ZrO_2$). The following features may, inter alia, be noted in FIG. 1: 650 cm$^{-1}$ and 610 cm$^{-1}$: (Zr—O) valence vibrations; 476 cm$^{-1}$: (Zr—O—Zr) valence vibrations; 1564 cm$^{-1}$ asymmetrical and 1458 cm$^{-1}$ symmetrical (COO) valence vibration, wherein the spacing is typical of chelating acetate groups with a hapticity of η=2; the bands at 900 cm$^{-1}$ and 640 cm$^{-1}$ associated with a (Zr—O—Si) bond in the literature are not directly discernible here, but it is assumed that the bands at 852 cm$^{-1}$ and part of the bands at 1084 cm$^{-1}$ are attributable to this structural element.

The gels according to the invention may be produced by performing a non-hydrolytic sol-gel process in an inert anhydrous organic solvent containing no hydroxyl groups, wherein one or more compounds (I) from the series of metal or semi-metal alkoxides, oxoalkoxides, amides or oxoamides are condensed, with elimination of carboxylic acid esters or carboxylic acid amides, until gelation occurs with one or more compounds (II) from the series of metal or semi-metal carboxylates or oxocarboxylates, wherein (I) and (II) themselves, or in the case of mixtures of substances on a statistical average, have at least two and preferably (I) and/or (II) have more than two eliminable groups.

The sol-gel process is conveniently performed in a solvent or solvent mixture with the above-stated characteristics. The metal or semi-metal compounds (I) and (II) to be reacted should be at least partially soluble in the solvent in order to permit a condensation reaction. It has been established that metal and semi-metal compounds which are substantially suspended in the solvent at the beginning of the reaction pass into solution during the reaction. The condensation of (I) with (II) initially gives rise to an organosol, as may be discerned from the Tyndall effect. As condensation of the dissolved oligomers proceeds, the sols change into gels, i.e. crosslinked polymers, wherein secondary valencies may also be active in crosslinking. The gel may coagulate as a monolithic block or, if there is sufficient solvent and vigorous stirring, in the form of particles.

The reaction temperature is not highly critical; it is conveniently in the range between 0° C. and 230° C., preferably between 20° C. and 150° C., in particular between 60° C. and 130° C. The duration of the reaction is naturally dependent upon the reaction temperature and is generally in the range from 1 to 100 h (=hours).

The metal and semi-metal alkoxides, oxoalkoxides, amides and oxamides (I) and carboxylates and oxocarboxylates (II) to be reacted have the following general formulae, wherein $M^1$ and $M^2$ each denote a metal or semi-metal atom and m and n respectively denote the valency thereof:

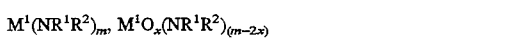

$R^1$, $R^2$, $R^3$ each again denote an organic reside of the above-stated meaning. m and n denote an integer between 2 and 6; preferably at least m or n is 3 or greater than 3; particularly preferred valencies are between 3 and 5. x and y respectively denote the number of oxo atoms in (I) and (II). If (I) and (II) are pure substances, x and y denote an integer 0, 1 or 2. If (I) and (II) are mixtures of substances, i.e. respectively partially oxylated alkoxides or amides and partially oxylated carboxylates, x and y denote any desired number greater than 0 and less than 2, wherein the indices (m–2x) and (n–2y) respectively denote a value of at least 2 to m and n respectively.

During production according to the invention of the gels according to the invention, one or more substances (I) are reacted with one or more substances (II) in accordance with the following general formula, which is exemplified by the production of binary gels, wherein, as before, for reasons of simplification, the residues —$OR^1$ and —$NR^1R^2$ are represented by Q and —O—C(O)—$R^3$ by —OT:

$$aM^1O_xQ_{m-2x} + bM^2O_y(OT)_{n-2y} \to zQ-T + M^1{}_aM^2{}_bO_{(ax+by+z)}$$
$$Q_{(am-2ax-z)}(OT)_{(bn-2by-z)}$$

$M^1$, $M^2$, m, n, x, y, —Q and —OT have the meanings already stated. The number of moles a and b establish the stoichiometry at which (I) and (II) are reacted together and z denotes the conversion index of the number of moles of QT formed. a and b are preferably selected such that on commencement of gelation, z assumes a numerical value between greater than 2 and the lower value of the indices (am–2ax) and (bn–2by). By way of example, gels of the formula $ZrSiO_zQ_{(4-z)}(OT)_{4-z}$ are obtained from equimolar quantities of $ZrQ_4$ and $Si(OT)_4$, and gels of the formula $V_2ZrO_{(2+z)}Q_{(6-z)}(OT)_{(4-z)}$ from 2 mol of $VOQ_3$ and 1 mol of $Zr(OT)_4$, with z in each case being greater than 2 up to 4. As already explained, the gel-forming reaction mixture may contain substances I and II in which $M^1$ and $M^2$ mean the same metal or semi-metal atom, for example a gel with the network $Zr_2O_zQ_{4-z}(OT)_{4-z}$ is obtained from $ZrQ_4$ and $Zr(OT)_4$, wherein z is preferably greater than 2 up to 4. Moreover, in the reaction mixture, in addition to the principal components (I) and(II), a proportion of (I) and/or (II) may be substituted by one or more compounds of the structural type of (I) and/or (II) in a quantity suitable for doping—in this manner, uniformly doped oxides and mixed oxides may be obtained after drying the gel and calcining the xerogel in the presence of oxygen.

The reactivity of components I and II and the equivalent ratio of —Q to —OT in the reaction mixture influence conversion and consequently z. By means of different combinations, for example $M^1Q_4$ with $M^2(OT)_4$ or $M^1(OT)_4$ with $M^2Q_4$, different reaction times (gelling time) and differing degrees of crosslinking of the gel may be achieved.

The gels produced according to the invention may readily be converted into the xerogels according to the invention by evaporating the solvent under reduced pressure.

The gels and xerogels according to the invention may be used for the production of oxide ceramic materials, namely oxides, mixed oxides and oxides and mixed oxides doped with further metals. The gels may furthermore be used for encapsulating particulate substances in a layer of an oxide ceramic material.

One specific application of the gels according to the invention and of the anhydrous sol-gel process according to the invention is the production of inclusion pigments. It has proved possible to achieve the virtually quantitative encapsulation of pigment grains in shells of anhydrous gel. The crude gel shell may be converted into a xerogel shell by drying and any organic residues may be eliminated from this by careful thermolysis in the presence of oxygen and the shell converted into a highly stable oxide ceramic. If mineralisers are added during the thermolysis operation, the amorphous gel shell may be crystallised at lower temperatures than in their absence, so providing milder conditions for sensitive colouring materials. Alkali fluorides and alkali halide mixtures are used as the mineralisers. In contrast with inclusion pigments produced using prior art processes (DE 231 2535), the encapsulating pigment shell of inclusion pigments produced using the sol-gel process according to the invention is not monocrystalline, but consists of a structure of many crystallites. These oxide shells may sometimes still contain amorphous portions. These shells are, however, sufficiently impervious in order to keep the encapsulated colouring materials enclosed even at extreme temperatures, as are necessary during decoration of ceramic articles. Another particular advantage is that inclusion pigments with a much higher inclusion rate and consequently higher colour saturation may be obtained by using the gels according to the invention.

The essential advantages of the gels and xerogels according to the invention and of the process for the production thereof are:

- the gels are anhydrous and contain no hydroxyl groups and thus permit the straightforward conversion of gel encapsulated pigments into impervious inclusion pigments with a high inclusion rate;
- the gels contain no bound halogen, which extends their possible range of uses and simplifies the processes for their use;
- the distribution of different metal atoms in the network is very uniform, which has a favourable effect on the homogeneity of derived products;
- the process for the production of the gels may readily be controlled as it is a single stage process;
- the gels, xerogels and derived oxide substances may be obtained at elevated purity and with a deliberately selected composition tailored to its particular application, for example as a catalyst;
- the options for obtaining oxide ceramic materials from gels have been extended by the novel process and the wide selection of substances.

EXAMPLE 1

Production of zirconium silicate by the non-aqueous sol-gel process according to the invention and subsequent thermolysis A conventional commercial 70% solution of zirconium tetra-n-propylate in propanol is distilled at 150° C. under a fine vacuum for 24 hours to produce a propanol-free zirconium tetra-n-propylate. According to FTIR investigation, the resultant waxy mass contains no alcoholic hydroxyl groups.

In order to produce silicon tetraacetate, silicon tetraacetate is produced from silicon tetrachloride and anhydrous sodium acetate using a method of Shuyten et al. (*J. Amer Chem. Soc.,* 69 (1947), 2110).

0.01 mol (2.64 g) of silicon acetate are first suspended in 40 ml of absolute toluene and brought to the boil in an apparatus sealed off from the atmosphere and filled with dry argon. A solution of 0.01 mol (3.27 g) of alcohol-free zirconium tetra-n-propylate in 60 ml of absolute toluene is added dropwise to the boiling suspension. The initially formed turbidity of the reaction mixture redissolves as dropwise addition proceeds. The reaction mixture is refluxed at boiling point for approximately 72 hours. The opacity of the initially clear reaction mixture here increases distinctly as the reaction proceeds, until a granular solid begins to precipitate.

The liquid constituents of the resultant gel are completely removed at 150° C. under a vacuum. The FTIR spectrum (FIG. 1) of the dried gel shows neither toluene bands nor traces of the n-propyl acetate formed during condensation. The FTIR spectrum also demonstrates the absence of hydroxyl groups in the xerogel.

Apart from the toluene as the principal constituent, the distillate contains only n-propyl acetate. The n-propyl acetate could be unambiguously detected in addition to the toluene in the distillate solvent mixture by FTIR spectroscopy by its characteristic absorption bands at 1742 cm$^{-1}$ and 1240 cm$^{-1}$ and by gas-chromatographic separation and subsequent investigation by mass spectroscopy.

Investigations of the gel and xerogel by differential thermal analysis and thermogravimetry show that any organic residues still attached to the metal atoms of the network are completely driven off in the stream of oxygen at temperatures of up to 550° C. The 39.4% loss of mass occurring on thermolysis allows the conversion rate of the condensation to be determined at 73%. The network of the gel and xerogel may thus be attributed the empirical stoichiometry $ZrSiO_{2.8}$ $(O-Pr)_{1.2}(O_2C-Me)_{1.2}$. In the formula, Pr denotes n-propyl and, if formed by isomerisation, also isopropyl and Me denotes methyl.

Stepwise crystallisation occurs on thermal treatment of the xerogel:

The first crystalline phase begins to form at 950° C. It is a tetragonal zirconium dioxide embedded in a matrix of amorphous silicon dioxide. Monoclinic zirconium dioxide crystallises from 1250° C., followed by cristobalite. Compound formation to yield zirconium silicate proceeds from 1400° C., which is produced as a pure phase from the anhydrous xerogel after 24 hours' calcination at 1400° C.

EXAMPLE 2

Production of zirconium dioxide

Zirconium tetraacetate ($Zr(OAc)_4$) was produced from zirconium tetrachloride and absolute acetic acid (Ludwig, J., Schwartz, D., Inorg. Chem., 9 (1970), 607).

0.01 mol (3.27 g) of zirconium tetraacetate are first suspended in 40 ml of absolute toluene and brought to the boil in an apparatus sealed off-from the atmosphere and filled with dry argon. A solution of 0.01 mol (3.27 g) of alcohol-free zirconium tetra-n-propylate in 60 ml of absolute toluene is added dropwise to the boiling suspension. The initially formed turbidity of the reaction mixture redissolves as dropwise addition proceeds. The reaction mixture is refluxed at boiling point for 60 hours, until a granular solid begins to precipitate.

The liquid constituents of the resultant gel are completely removed at 150° C. under a vacuum. Apart from toluene as the principal constituent, only n-propyl acetate could be detected in the distillate. The FTIR spectrum of the dried gel, i.e. of the xerogel, shows neither toluene bands nor traces of the n-propyl acetate formed during condensation; the FTIR spectrum also demonstrates the absence of hydroxyl groups. FIG. 2 shows the FTIR spectrum of the xerogel (KBr compact).

Investigations of the gel and xerogel by differential thermal analysis and thermogravimetry demonstrate that any organic residues still attached to the metal atoms of the network are completely driven off in the stream of oxygen at temperatures of up to 500° C. The 39.85% loss of mass occurring on thermolysis allows the conversion rate of the condensation to be determined at 60%; the network of the gel and xerogel may thus be attributed the empirical stoichiometry $ZrO_{1.2}(O-Pr)_{0.8}(O_2C-Me)_{0.8}$.

Crystallisation of the xerogel to yield $ZrO_2$ proceeds stepwise; the first crystalline phase begins to form at 400° C. It is tetragonal zirconium dioxide. From 700° C., monoclinic zirconium dioxide crystallises, replacing the tetragonal phase. From 900° C., this is present as a virtually pure phase.

EXAMPLE 3

Production of $ZrV_2O_7$ $VO(OPr)_3$ and $Zr(OAc)_4$ are reacted in accordance with the following equation:

$$2\ VO(OPr)_3 + Zr(OAc)_4 \rightarrow V_2ZrO_{2+z}(OPr)_{6-z}(OAc)_{4-z} + z\ AcOPr$$

3.57 g (0.011 mol) of $Zr(OAc)_4$ are first suspended in 60 ml of dry toluene and this mixture is brought to the boil in an apparatus sealed off from the atmosphere and filled with dry argon. 5.33 g (0.022 mol) of $VO(OPr)_3$ (vanadyl n-propylate), dissolved in 40 ml of dry toluene, are slowly added dropwise to the boiling initial mixture. The reaction mixture very rapidly turns dark green and a black-green, fine solid is formed. The mixture is refluxed for 48 hours. The supernatant solution is then stripped out under a vacuum. This distillate contains only toluene and n-propyl acetate as condensation product.

DTA/TG investigation shows that, on thermolysis in a stream of oxygen to yield $ZrV_2O_7$ ceramic, the xerogel loses a further 25% of its mass. It is thus possible to conclude that condensation was virtually complete during gelation—z is approximately 4.

EXAMPLE 4

$ZrSiO_4$ from $Si(NMe_2)_4$ and $Zr(OAc)_4$

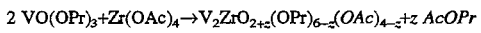

$$Zr(OAc)_4 + Si(NMe_2)_4 \rightarrow ZrSiO_z(NMe_2)_{4-z}(OAc)_{4-z} + z\ CH_3CONMe_2$$

1.635 g (0.005 mol) of $Zr(OAc)_4$ are first suspended in 50 ml of dry toluene and this mixture is brought to the boil in an apparatus sealed off from the atmosphere and filled with dry argon. 1.02 g (0.005 mol) of $Si(NMe_2)_4$, dissolved in 50 ml of dry toluene, are slowly added dropwise to the boiling initial mixture. The mixture is refluxed for 48 hours. A fine, ivory-coloured solid is formed. The supernatant solution is then stripped out under a vacuum.

The distillate is investigated by GC/MS and N,N-dimethylacetamide was found to have been formed as the condensation product.

DTA/TG investigation shows that, on thermolysis in a stream of oxygen to yield solid $ZrSiO_4$, the xerogel loses a further 42% of its mass. It is thus possible to conclude that condensation proceeded to approximately 61% during gelation—z in the formula is thus approximately 2.44.

EXAMPLE 5

Production of cadmium yellow inclusion pigments by means of the anhydrous sol-gel process according to the invention 0.075 mol (19.8 g) of silicon tetraacetate and 3.5 g of cadmium yellow pigment (from Degussa) are first suspended in 300 ml of absolute toluene and brought to the boil in an apparatus sealed off from the atmosphere and filled with dry argon. A solution of 0.075 mol (24.52 g) of alcohol-free zirconium tetra-n-propylate in 450 ml of absolute toluene is slowly added dropwise to the boiling suspension, wherein the mixture is vigorously stirred. The mixture is refluxed at boiling point for approximately 72 hours with vigorous stirring. The mixture is then stirred for a further 5 hours at room temperature in order to allow sufficient time for the forming gel shell to form around the pigment grains. On completion of the reaction, the intensely yellow reaction mixture has an elevated viscosity. The solvent is first stripped out at 150° C. under a vacuum and the dry, pulverulent, intensely yellow xerogel with the pigment inclusions is subjected to a thermolysis programme so that bound organic residues are removed and the amorphous gel shell may crystallise or at least becomes impervious. The thermolysis programme proceeds as follows: 24 h each at 250° and 350° C. under a dynamic vacuum; 24 h each in 400° and 500° C. under a stream of nitrogen; 12 h each at 600° and 700° C. under a stream of argon.

The inclusion pigment thermally treated in this manner is loosely combined with an equal weight of a mineraliser. The mineraliser consists of a mixture of 1 part by weight of sodium fluoride and 30 parts by weight of sodium chloride.

The inclusion pigment/mineraliser mixture is thermolysed for 3 hours at a temperature of 900° C. After cooling, the mineraliser is removed from the inclusion pigment by extraction with water.

Investigation of the inclusion pigment produced according to the invention by powder diffractometry reveals that the thermolysed shell is of a polycrystalline and multi-phase structure. The shell consists of tetragonal an monoclinal zirconium dioxide, a large proportion of zirconium silicate and amorphous silicon dioxide.

It has been found that the shell of the inclusion pigments produced according to the invention is sufficiently impervious and withstands temperatures of up to 1100° C. in sodium chloride melts.

What is claimed is:

1. An anhydrous gel or xerogel containing no hydroxyl groups and based on a network of oxygen-bridged metal and/or semi-metal atoms, wherein the network contains one or more species of metal and/or semi-metal atoms and additionally present unbridged valencies of the metal and/or semi-metal atoms are saturated by oxygen atoms and/or by monovalent residues from the series —Q and/or —OT, wherein —Q denotes —OR$^1$ or —NR$^1$R$^2$, —T denotes —C(O)R$^3$ and R$^1$, R$^2$ and R$^3$ denote an aliphatic or aromatic organic residue, and no halogen is attached to metal and/or semi-metal atoms.

2. A gel or xerogel according to claim 1, wherein
   the network metal and/or semi-metal atoms contained are those of the elements of main group and subgroup III to V and the rare-earth elements and the network has one, two, three or four different species of metal and/or semi-metal atoms.

3. A gel or xerogel according to claim 1, wherein
   R$^1$, R$^2$ and R$^3$ of the residues Q and T denote alkyl with 1 to 6 C atoms.

4. A gel or xerogel according to claim 2, wherein
   R$^1$, R$^2$ and R$^3$ of the residues Q and T denote alkyl with 1 to 6 C atoms.

5. A gel or xerogel according to any one of claims 1 to 4, having a network of the empirical formula $$M^1{}_a M^2{}_b\, O_{(ax+by+z)} Q_{(am-2ax-z)} (OT)_{(bn-2by-z)},$$

obtainable by a sol-gel process, wherein a moles of a metal compound of the general formula (I)

$$M^1 O_x Q_{(m-2x)} \tag{I}$$

are reacted in an anhydrous medium containing no hydroxyl groups with b moles of a metal compound of the general formula (II)

$$M^2 O_y (OT)_{(n-2y)} \tag{II}$$

forming z mol of Q—T, in which
   M$^1$: means metal or semi-metal atom of valency m;
   M$^2$: means metal or semi-metal atom of valency n, wherein M$^1$ and M$^2$ may be identical or different;
   x, y: mean the number 0 for m, n equals 3 and 0 or 1 for m, n equals 4 or 5;
   Q, T: mean residues according to claim 1;
   Z: means a number between greater than 2 and the lower value of the indices (am−2ax) and (bn−2by);
   a, b: a=number of moles of (I), b=number of moles of (II), wherein a and b are selected such that z may be greater than 2.

6. A gel or hydrogel according to any one of claims 1 to 4, having a network of the empirical formula $$V_2 Zr\, O_{2+z} Q_{(6-z)} (OT)_{(4-z)},$$
$$ZrSi\, O_z Q_{(4-z)} (OT)_{(4-z)}, \text{ or}$$
$$Zr_2 O_z Q_{(4-z)} (OT)_{(4-z)},$$

wherein
   z is in each case any desired number greater than 2 up to 4.

7. A gel according to any one of claims 1 to 4, containing as dispersant an aprotic, non-nucleophilic solvent.

8. A gel according to claim 7 wherein said solvent is from the series of aromatic hydrocarbons and isoparaffins with a boiling point between 80° and 230° C.

9. A gel according to claim 8 wherein the boiling point is from 80° C. to 150° C.

10. A process for the production of an anhydrous gel containing no hydroxyl groups according to claim 1 which comprises performing a non-hydrolytic sol-gel process in an inert anhydrous organic solvent containing no hydroxyl groups, wherein one or more compounds (I) from the series of metal or semi-metal alkoxides, oxoalkoxides, amides or oxoamides are condensed, with elimination of carboxylic acid esters or carboxylic acid amides, until gelation occurs with one or more compounds (II) from the series of metal or semi-metal carboxylates or oxocarboxylates, wherein (I) and (II) themselves, or in the case of mixtures of substances on a statistical average, have at least two eliminable groups.

11. A process according to claim 10, wherein
   a moles of at least one compound of the general formula M$^1$O$_x$Q$_{(m-2x)}$ (I) are condensed with b moles of at least one compound of the general formula M$^2$O$_y$(OT)$_{(n-2y)}$ (II) with elimination of z moles of Q—T, in which
   M$^1$: means metal or semi-metal atom of valency m and
   M$^2$: means metal or semi-metal atom of valency n, wherein M$^1$ and M$^2$ may be identical or different;
   m, n: means an integer between 2 and 6, wherein m or n is greater than or equal to 3;
   Q, T: Q equals —OR$^1$ or —NR$^1$R$^2$, T equals —C(O)R$^3$, wherein R$^1$, R$^2$ and R$^3$ denote aliphatic or aromatic organic residues;
   x, y: means 0, 1 or 2 in one compound (I) or (II) or any desired number between 0 and 2 in mixtures of (I) or (II), wherein, however, (m−2x) and (n−2y) respectively denote a value of at least 2 up to m and of 2 up to n;

a, b: mean the number of moles of (I) or (II), wherein a and b are selected such that, on commencement of gelation, z assumes a value of between greater than 2 and the lower value of the indices (am−2ax) and (bn−2by).

12. A process for the production of an anhydrous xerogel containing no hydroxyl groups which comprises removing the organic solvent from a gel produced according to claim 10.

13. A process according to claim 12 wherein the solvent is removed by evaporating under reduced pressure.

14. In a method wherein a particulate substance is encapsulated in a layer of an oxide ceramic material, the improvement wherein a gel or xerogel as defined in claim 1 is employed in forming the layer of oxide ceramic material.

15. A gel or xerogel according to claim 3 wherein the alkyl is of 1 to 3 C atoms.

16. A gel or xerogel according to claim 4 wherein the alkyl is of 1 to 3 C atoms.

17. A process according to claim 10 wherein (I) and/or (II) have more than two eliminable groups.

18. A process according to claim 11 wherein $R^1$, $R^2$ and $R^3$ denote alkyl with 1 to 6 C atoms.

* * * * *